(12) United States Patent
Hwangbo et al.

(10) Patent No.: US 11,762,092 B2
(45) Date of Patent: Sep. 19, 2023

(54) LIDAR APPARATUS AND CONTROL METHOD THEREOF

(71) Applicant: SAMSUNG ELECTRONICS CO., LTD., Suwon-si (KR)

(72) Inventors: Minsu Hwangbo, Suwon-si (KR); Myungsik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 472 days.

(21) Appl. No.: 16/918,564

(22) Filed: Jul. 1, 2020

(65) Prior Publication Data

US 2021/0003706 A1 Jan. 7, 2021

(30) Foreign Application Priority Data

Jul. 1, 2019 (KR) .................. 10-2019-0079004

(51) Int. Cl.
*G01S 17/10* (2020.01)
*G01S 17/89* (2020.01)
(Continued)

(52) U.S. Cl.
CPC .............. *G01S 17/10* (2013.01); *G01S 7/481* (2013.01); *G01S 7/4868* (2013.01); *G01S 17/89* (2013.01)

(58) Field of Classification Search
CPC ........ G01S 7/4815; G01S 17/08; G01S 17/10; G01S 7/481; G01S 17/89; G01S 7/4817;
(Continued)

(56) References Cited

U.S. PATENT DOCUMENTS

| 7,544,945 B2 | 6/2009 | Tan et al. |
| 10,915,765 B2 | 2/2021 | Day et al. |

(Continued)

FOREIGN PATENT DOCUMENTS

| KR | 10-2019-0014313 A | 2/2019 |
| KR | 1020190011497 A | 2/2019 |

(Continued)

OTHER PUBLICATIONS

Communication dated Oct. 15, 2020, issued by the International Searching Authority in counterpart International Application No. PCT/KR2020/008616 (PCT/ISA/220, 210, 237).

(Continued)

*Primary Examiner* — Yuqing Xiao
*Assistant Examiner* — Zhengqing Qi
(74) *Attorney, Agent, or Firm* — Sughrue Mion, PLLC

(57) ABSTRACT

A method of acquiring distance information of an object by using a LiDAR apparatus includes: irradiating a first laser light of a first type toward surroundings of the LiDAR apparatus for a first time period; receiving a first reflected laser light of the first laser light reflected from a first object located around the LiDAR apparatus, by using an optical sensor of the LiDAR apparatus; irradiating a second laser light of a second type, which is different from the first type, toward the surroundings of the LiDAR apparatus for a second time period following the first time period; receiving a second reflected laser light of the second laser light reflected from a second object located around the LiDAR apparatus, by using the optical sensor; and acquiring an image frame including distance information representing a distance between the LiDAR apparatus and the first object and distance information representing a distance between the LiDAR apparatus and the second object, based on the first reflected laser light and the second reflected laser light.

20 Claims, 12 Drawing Sheets

(51) Int. Cl.
    *G01S 7/481* (2006.01)
    *G01S 7/486* (2020.01)
(58) Field of Classification Search
    CPC ........ G01S 7/4863; G01S 17/06; G01S 17/02;
    G01S 17/894; G01S 7/484; G01S 7/4868;
    G01S 7/486; G01S 7/483; G01S 7/4861;
    G01S 7/10
    See application file for complete search history.

(56) References Cited

U.S. PATENT DOCUMENTS

| | | |
|---|---|---|
| 2015/0109603 A1 | 4/2015 | Kim et al. |
| 2017/0269197 A1* | 9/2017 | Hall ...................... G01S 7/4868 |
| 2017/0269209 A1* | 9/2017 | Hall ...................... G01S 7/4815 |
| 2017/0299384 A1 | 10/2017 | Shin |
| 2017/0307758 A1 | 10/2017 | Pei et al. |
| 2018/0113200 A1* | 4/2018 | Steinberg .............. G01S 7/4815 |
| 2018/0188371 A1 | 7/2018 | Bao et al. |
| 2018/0196998 A1 | 7/2018 | Price et al. |
| 2018/0267152 A1 | 9/2018 | McMichael et al. |
| 2019/0011561 A1 | 1/2019 | Pacala et al. |
| 2019/0079192 A1 | 3/2019 | Fenton et al. |
| 2019/0109977 A1* | 4/2019 | Dutton .................. G01S 17/894 |
| 2019/0293765 A1* | 9/2019 | Jeong ..................... G02B 19/00 |
| 2019/0310375 A1* | 10/2019 | Finkelstein ........... G01S 7/4868 |
| 2020/0088843 A1* | 3/2020 | Tsai ........................ G01S 17/04 |
| 2020/0200910 A1* | 6/2020 | Pan .......................... G01S 7/484 |
| 2020/0264280 A1* | 8/2020 | Wei ........................ G01S 17/36 |
| 2020/0284908 A1* | 9/2020 | Paulsen .................. G01S 17/10 |

FOREIGN PATENT DOCUMENTS

| | | |
|---|---|---|
| KR | 1020190014313 A | 2/2019 |
| KR | 10-2019-0049871 A | 5/2019 |

OTHER PUBLICATIONS

Communication dated Mar. 17, 2022 issued by the European Patent Office in counterpart EP Application No. 20834119.8.

* cited by examiner

LIDAR APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0079004, filed on Jul. 1, 2019, in the Korean Intellectual Property Office, the disclosure of which is incorporated by reference herein in its entirety.

BACKGROUND

1. Field

The disclosure relates to a Light Detection and Ranging (LiDAR) apparatus and a control method thereof, and more particularly, to a LiDAR apparatus for acquiring distance information of an object by controlling a plurality of light sources, and a control method thereof.

2. Description of Related Art

A LiDAR apparatus is used for measuring a distance to an object by using laser light. The LiDAR apparatus is used in various fields, such as autonomous vehicles, robots, global environment observation, atmospheric analysis, unmanned equipment, etc. The LiDAR apparatus acquires distance information of an object by irradiating high-powered pulse laser light to the surroundings of the LiDAR apparatus and measuring a time taken for the irradiated laser light to be reflected from the object and then returned.

The LiDAR apparatus may acquire an image frame including distance information by using a plurality of light sources including a short-distance light source and a long-distance light source, to accurately measure a distance. However, when the LiDAR apparatus measures a distance by using the plurality of light sources, a frame rate might be reduced. When a frame rate is reduced and thus the number of image frames capable of being acquired per second is reduced, the distance measurement quality of the LiDAR apparatus might be lowered.

SUMMARY

Provided are a LiDAR apparatus for acquiring an image fame by controlling a first light source and a second light source, and a control method thereof.

Provided are a LiDAR apparatus capable of changing an irradiation time of a first light source or a second light source according to a light quantity accumulation value representing an accumulated light quantity of reflected laser light, and a control method thereof.

Provided are a LiDAR apparatus capable of efficiently managing a frame rate while using a plurality of light sources, and a control method thereof.

Additional aspects will be set forth in part in the description which follows and, in part, will be apparent from the description, or may be learned by practice of the presented embodiments.

In accordance with an aspect of the disclosure, a method of acquiring distance information of an object by using a LiDAR apparatus includes: irradiating a first laser light of a first type toward surroundings of the LiDAR apparatus for a first time period; receiving a first reflected laser light of the first laser light reflected from a first object located around the LiDAR apparatus, by using an optical sensor of the LiDAR apparatus; irradiating a second laser light of a second type toward the surroundings of the LiDAR apparatus for a second time period following the first time period; receiving a second reflected laser light of the second laser light reflected from a second object located around the LiDAR apparatus, by using the optical sensor; and acquiring an image frame including distance information representing a distance between the LiDAR apparatus and the first object and distance information representing a distance between the LiDAR apparatus and the second object, based on the first reflected laser light and the second reflected laser light.

In accordance with an aspect of the disclosure, the acquiring of the image frame may further include: calculating the distance between the LiDAR apparatus and the first object based on a time at which the first laser light is irradiated and a time at which the first reflected laser light is received; and calculating the distance between the LiDAR apparatus and the second object based on a time at which the second laser light is irradiated and a time at which the second reflected laser light is received.

In accordance with an aspect of the disclosure, the first laser light of the first type may be irradiated toward a short-distance area around the LiDAR apparatus from a plane light source of the LiDAR apparatus, and the second laser light of the second type may be irradiated toward a long-distance area around the LiDAR apparatus from a line light source of the LiDAR apparatus.

In accordance with an aspect of the disclosure, the first laser light of the first type may be irradiated toward a long-distance area around the LiDAR apparatus from a line light source of the LiDAR apparatus, and the second laser light of the second type may be irradiated toward a short-distance area around the LiDAR apparatus from a plane light source of the LiDAR apparatus.

In accordance with an aspect of the disclosure, the first laser light may be laser light including a plurality of first pulse groups, the second laser light may be laser light including a plurality of second pulse groups, a length of the first time period may be adjusted by changing the number of the first pulse groups, and a length of the second time period may be adjusted by changing the number of the second pulse groups.

In accordance with an aspect of the disclosure, the plurality of first pulse groups may be arranged at preset intervals, each first pulse group including a plurality of pulses, and the plurality of second pulse groups may be arranged at preset intervals, each second pulse group including a plurality of pulses.

In accordance with an aspect of the disclosure, the method may further include: acquiring a first light quantity accumulation value by accumulating a light quantity of the first reflected laser light; determining the first time period based on the first light quantity accumulation value; acquiring a second light quantity accumulation value by accumulating a light quantity of the second reflected laser light; and determining the second time period based on the first time period and the second light quantity accumulation value.

In accordance with an aspect of the disclosure, the determining of the first time period may include determining the first time period to finish irradiating the first laser light when the first light quantity accumulation value reaches a saturation value of the optical sensor.

In accordance with an aspect of the disclosure, the determining of the second time period may include: determining the second time period to irradiate the second laser light continuously after the irradiating of the first laser light is finished; and determining the second time period to finish irradiating the second laser light when the second light quantity accumulation value reaches the saturation value of the optical sensor.

In accordance with an aspect of the disclosure, the determining of the first time period may include: determining a saturation expected time at which the first light quantity accumulation value reaches the saturation value of the optical sensor of the LiDAR apparatus, based on a change of the first light quantity accumulation value according to time; and determining the first time period based on a unit frame time period corresponding to the image frame and the saturation expected time.

In accordance with an aspect of the disclosure, a LiDAR apparatus includes: a first light source configured to irradiate a first laser light of a first type; a second light source configured to irradiate a second laser light of a second type; an optical sensor; and at least one processor configured to control the first light source to irradiate the first laser light toward surroundings of the LiDAR apparatus for a first time period, receive a first reflected laser light of the first laser light reflected from a first object located around the LiDAR apparatus by using the optical sensor, control the second light source to irradiate the second laser light toward the surroundings of the LiDAR apparatus for a second time period following the first time period, receive a second reflected laser light of the second laser light reflected from a second object located around the LiDAR apparatus by using the optical sensor, and acquire an image frame including distance information representing a distance between the LiDAR apparatus and the first object and distance information representing a distance between the LiDAR apparatus and the second object, based on the first reflected laser light and the second reflected laser light.

In accordance with an aspect of the disclosure, a computer-readable recording medium stores a program for controlling a LiDAR apparatus to perform operations of: irradiating a first laser light of a first type toward surroundings of the LiDAR apparatus for a first time period; receiving a first reflected laser light of the first laser light reflected from a first object located around the LiDAR apparatus, by using an optical sensor of the LiDAR apparatus; irradiating a second laser light of a second type toward the surroundings of the LiDAR apparatus for a second time period following the first time period; receiving a second reflected laser light of the second laser light reflected from a second object located around the LiDAR apparatus, by using the optical sensor; and acquiring an image frame including distance information representing a distance between the LiDAR apparatus and the first object and distance information representing a distance between the LiDAR apparatus and the second object, based on the first reflected laser light and the second reflected laser light.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Certain embodiments will be described in detail with reference to the accompanying drawings. However, embodiments can be implemented in various different forms.

It will be understood that the case in which a certain portion is "connected" to another portion includes the case in which the portion is "electrically connected" to the other portion with another device in between, as well as the case in which the portion is "directly connected" to the other portion. Also, it will be understood that when a certain portion "includes" a certain component, the portion does not exclude another component but can further include another component, unless the context clearly dictates otherwise.

As used herein, the expression "at least one of a, b or c" indicates only a, only b, only c, both a and b, both a and c, both b and c, all of a, b, and c, or variations thereof.

As used herein, the terms "1st" or "first", "2nd" or "second", or the like, may use corresponding components regardless of importance or order and are used to distinguish one component from another, without limiting the components.

As used herein, the terms "portion", "module", etc. may be a hardware component such as a processor or a circuit, and/or a software component that is executed by a hardware component such as a processor.

Figure 1:
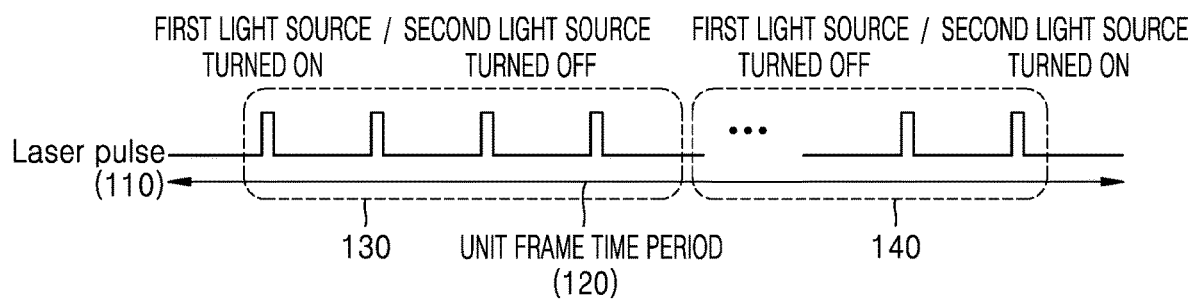
FIG. 1 is a conceptual view of a method of acquiring distance information of an object by using a LiDAR apparatus, according to an embodiment.

FIG. 1 is a conceptual view of a method of acquiring distance information of an object by using a LiDAR apparatus, according to an embodiment.

Referring to FIG. 1, the LiDAR apparatus may irradiate a laser pulse 110 to surroundings to acquire distance information of an object. The LiDAR apparatus may receive a reflected laser pulse of the laser pulse 110 reflected from the object. According to an embodiment, the LiDAR apparatus may compare the reflected laser pulse to the laser pulse 110, which is irradiated, to calculate a distance to the object. For example, the LiDAR apparatus may calculate a distance to the object by analyzing the reflected laser pulse according to a TOF method.

The LiDAR apparatus may include a plurality of light sources including a first light source and a second light source. The first light source and the second light source may be light sources for irradiating light to different areas around the LiDAR apparatus. For example, the LiDAR apparatus may control a plane light source to irradiate three-dimensional (3D) laser light to a short-distance area around the LiDAR apparatus and control a line light source to irradiate two-dimensional (2D) laser light to a long-distance area around the LiDAR apparatus. The LiDAR apparatus may use the light sources to acquire an image frame including distance information of an object located in the short-distance area around the LiDAR apparatus and distance information of an object located in the long-distance area around the LiDAR apparatus.

The laser pulse 110 may include a laser pulse irradiated from the first light source and a laser pulse irradiated from the second light source. For example, in an embodiment, the first light source may be a plane light source and the second light source may be a line light source, or the first light source may be a line light source and the second light source may be a plane light source.

For example, a unit frame time period 120 may be a time period for which the LiDAR apparatus irradiates the laser pulse 110 to acquire an image frame including distance information about a distance to an object around the LiDAR apparatus. For example, when a frame rate of the LiDAR apparatus is 30 frames per second (fps), the unit frame time period 120 may be shorter than or equal to ⅟₃₀ seconds.

According to an embodiment, the LiDAR apparatus may include a single optical sensor due to limitations of implementation, cost reduction, etc. When the LiDAR apparatus irradiates a plurality of portions of laser light by using the single optical sensor and the plurality of light sources simultaneously, light interference may occur between different portions of laser light. When light interference occurs between different portions of laser light, it might be difficult to analyze received portions of light. Accordingly, when the LiDAR apparatus uses the optical sensor and the plurality of light sources, the LiDAR apparatus may activate the light sources alternately, instead of activating the light sources simultaneously, thereby preventing different portions of laser light from interfering and accurately calculating a distance to an object.

When the LiDAR apparatus acquires an image frame including distance information of an object located in a short-distance area from the LiDAR apparatus and distance information of an object located in a long-distance area from the LiDAR apparatus by using the light sources, a frame rate of the LiDAR apparatus may be reduced compared to when the LiDAR apparatus acquires an image frame including distance information of an object located in an area by using one light source. For example, when the unit frame time period 120 of the LiDAR apparatus is set to ⅟₃₀ seconds, the LiDAR apparatus may acquire distance information of an object located in a short-distance area for the unit frame time period 120, then acquire distance information of an object located in a long-distance area for a next unit frame time period 120, and combine the acquired two pieces of distance information to acquire an image frame. However, because two unit frame time periods 120 are consumed to acquire an image frame, a frame rate of the LiDAR apparatus may be reduced to 15 fps from 30 fps.

According to the LiDAR apparatus of an embodiment and a control method thereof, when the LiDAR apparatus acquires an image frame including distance information of an object located in a short-distance area from the LiDAR apparatus and distance information of an object located in a long-distance area from the LiDAR apparatus by using the plurality of light sources, the LiDAR apparatus may acquire the distance information of the object located in the short-distance area and the distance information of the object located in the long-distance area together within a unit frame time period 120. Because the LiDAR apparatus acquires the distance information of the object located in the short-distance area and the distance information of the object located in the long-distance area together within a unit frame time period 120, the LiDAR apparatus may efficiently manage a frame rate. For example, the LiDAR apparatus may maintain, when using the plurality of light sources, a frame rate of when using a single light source.

Referring to FIG. 1, the LiDAR apparatus according to an embodiment may turn on the first light source and turn off the second light source for a first time period 130 of the unit frame time period 120 to irradiate first laser light toward a first area around the LiDAR apparatus. After the first time period 130 terminates, the LiDAR apparatus may turn off the first light source and turn on the second light source for a second time period 140 of the unit frame time period 120 to irradiate second laser light toward a second area around the LiDAR apparatus. The second time period 140 starts after the first time period 130 such that the first time period 130 and the second time period 140 extend continuously in the unit frame time period 120. The first light source and the second light source may respectively be a plane light source and a line light source and vice versa, and the first area and the second area may respectively be a short-distance area and a long-distance area and vice versa. That is, the LiDAR apparatus may distribute a time period for irradiating laser light from the first light source and a time period for irradiating laser light from the second light source in the unit frame time period 120, thereby efficiently managing a frame rate.

Figure 2:
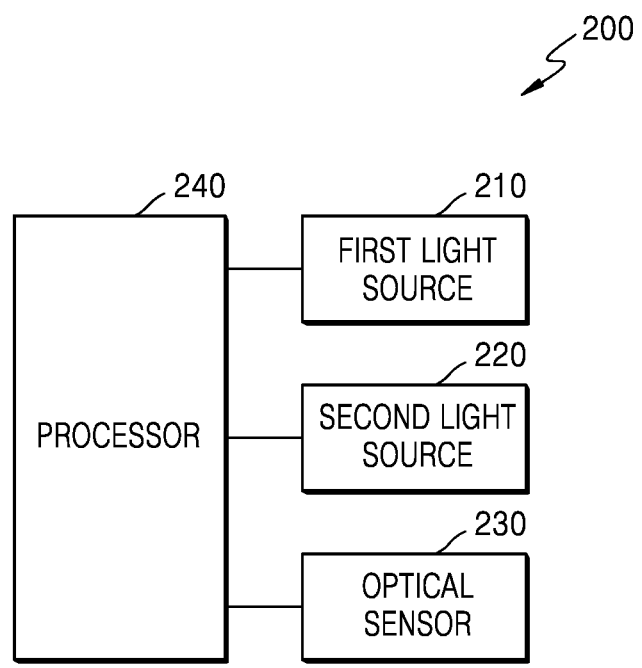
FIG. 2 is a block diagram of a LiDAR apparatus according to an embodiment.

FIG. 2 is a block diagram of a LiDAR apparatus according to an embodiment.

Referring to FIG. 2, a LiDAR apparatus 200 according to an embodiment may include a first light source 210, a second light source 220, an optical sensor 230, and a processor 240. The LiDAR apparatus 200 may further include a memory.

The first light source 210 may be a device emitting laser light. The first light source 210 may include at least one laser output device. The first light source 210 may include a beam steering device for steering laser light. The beam steering device may include a mirror for reflecting laser light and a lens for refracting laser light. The first light source 210 may steer and irradiate laser light toward surroundings of the LiDAR apparatus 200 by using the beam steering device, and irradiate a plurality of pieces of laser light in a flash or shot form. The first light source 210 may include a plane light source or a line light source. The plane light source and line light source will be described in detail with reference to FIG. 5, later.

The second light source 220 may be a device emitting laser light. The second light source 220 may include at least one laser output device. The second light source 220 may include a beam steering device for steering laser light. The beam steering device may include a mirror for reflecting laser light and a lens for refracting laser light. The second light source 220 may steer and irradiate laser light toward surroundings of the LiDAR apparatus 200 by using the beam steering device, and irradiate a plurality of pieces of laser light in a flash or shot form. The second light source 220 may include a plane light source or a line light source.

The optical sensor 230 may receive laser light reflected from an object. The optical sensor 230 may include at least one sensor device. For example, the sensor device may include a PN photodiode, a phototransistor, a positive-intrinsic-negative (PIN) photodiode, an avalanche photo-diode (APD), a single-photon avalanche diode (SPAD), a silicon photomultiplier (SiPM), a charge-coupled device (CCD), etc. The optical sensor 230 may include a condensing lens for concentrating a received laser beam. The optical sensor 230 may include a Time of Flight (ToF) sensor. The ToF sensor may include a receiver A for receiving in-phase received light and a receiver B for receiving out-of-phase received light. The optical sensor 230 may be at a center of the LiDAR apparatus 200 to sense a light signal traveling toward the optical sensor 230. However, the optical sensor 230 may be at any other location.

The memory may store programs for processing and control of the processor 240, and data input to the LiDAR apparatus 200 or to be output from the LiDAR apparatus 200. The memory may include at least one kind of storage medium of a flash memory type, a hard disk type, a multimedia card micro type, a card type memory (for example, Secure Digital (SD) memory or eXtreme Digital (XD) memory), random access memory (RAM), static random access memory (SRAM), read-only memory (ROM), electrically erasable programmable read-only memory (EEPROM), and programmable read-only memory (PROM), magnetic memory, a magnetic disk, or an optical disk.

The processor 240 may control all operations of the LiDAR apparatus 200. For example, the processor 240 may execute the programs stored in the memory to control all operations of the first light source 210, the second light source 220, the optical sensor 230, etc. The processor 240 may be configured with at least one processor.

The processor 240 may control the first light source 210 to irradiate first laser light toward surroundings of the LiDAR apparatus 200 for a first time period, use the optical sensor 230 to receive first reflected laser light of the first laser light reflected from a first object located around the LiDAR apparatus 200, control the second light source 220 to irradiate second laser light toward the surroundings of the LiDAR apparatus 200 for a second time period following the first time period, use the optical sensor 230 to receive second reflected laser light of the second laser light reflected from a second object located around the LiDAR apparatus 200, and acquire an image frame including distance information representing a distance between the LiDAR apparatus 200 and the first object and distance information representing a distance between the LiDAR apparatus 200 and the second object, based on the first reflected laser light and the second reflected laser light.

The processor 240 may calculate a distance between the LiDAR apparatus 200 and the first object based on a time at which the first laser light is irradiated and a time at which the first reflected laser light is received, and calculate a distance between the LiDAR apparatus 200 and the second object based on a time at which the second laser light is irradiated and a time at which the second reflected laser light is received.

According to an embodiment, the first light source 210 may be a plane light source and the first laser light of a first type may be irradiated toward a short-distance area around the LiDAR apparatus 200 from the plane light source, while the second light source 220 may be a line light source and the second laser light of a second type may be irradiated toward a long-distance area around the LiDAR apparatus 200 from the line light source.

According to an embodiment, the first light source 210 may be a line light source and the first laser light of the first type may be irradiated toward the long-distance area around the LiDAR apparatus 200 from the line light source, while the second light source 220 may be a plane light source and the second laser light of the second type may be irradiated toward the short-distance area around the LiDAR apparatus 200 from the plane light source.

According to an embodiment, the first laser light may be a laser light having a plurality of first pulse groups, and the second laser light may be a laser light having a plurality of second pulse groups. The processor 240 may change the number of first pulse groups to adjust a length of the first time period, and change the number of second pulse groups to adjust a length of the second time period.

According to an embodiment, the first pulse groups may be arranged at preset intervals, each first pulse group including a plurality of pulses, and the second pulse groups may be arranged at preset intervals, each second pulse group including a plurality of pulses.

The processor 240 may accumulate a light quantity of the first reflected laser light to acquire a first light quantity accumulation value, determine a first time period based on the first light quantity accumulation value, accumulate a light quantity of the second reflected laser light to acquire a second light quantity accumulation value, and determine a second time period based on the first time period and the second light quantity accumulation value.

The processor 240 may determine a first time period to finish irradiating the first laser light when the first light quantity accumulation value reaches a saturation value of the optical sensor 230.

The processor 240 may determine a second time period to irradiate the second laser light continuously after finishing irradiating the first laser light and to finish irradiating the second laser light when the second light quantity accumulation value reaches the saturation value of the optical sensor 230.

Figure 3:
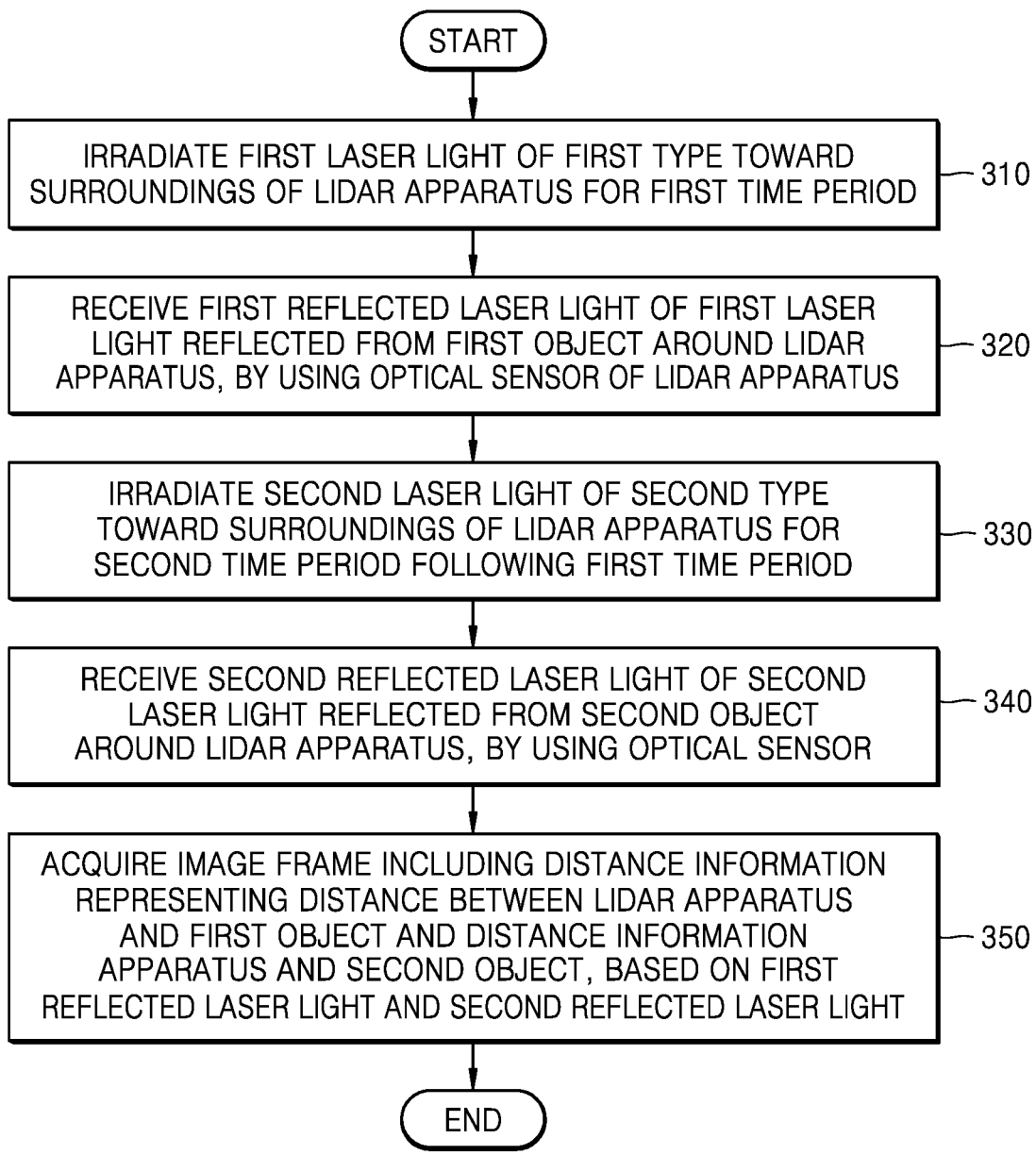
FIG. 3 is a flowchart of a method of acquiring distance information of an object by using a LiDAR apparatus according to an embodiment.

FIG. 3 is a flowchart of a method of acquiring distance information of an object by using the LiDAR apparatus 200 according to an embodiment.

In operation 310, the LiDAR apparatus 200 may irradiate first laser light of a first type toward surroundings of the LiDAR apparatus 200 for a first time period.

The first time period may be a time period included in a unit frame time period, which is a time period for which the LiDAR apparatus 200 irradiates a laser pulse to acquire an image frame including distance information about a distance to a surrounding object.

According to an embodiment, the first laser light of the first type may be laser light that is irradiated from a plane light source of the LiDAR apparatus 200 toward a short-distance area around the LiDAR apparatus 200. The first type may indicate a 3D laser light type. The 3D laser light type may be a type of laser light that is irradiated for 3D measurement for a field of view (FOV). Alternatively, the first laser light of the first type may be laser light that is irradiated from a line light source of the LiDAR apparatus 200 toward a long-distance area around the LiDAR apparatus 200. The first type may indicate a 2D laser light type.

The 2D laser light type may be a type of laser light that is irradiated for 2D measurement for an FOV.

The LiDAR apparatus 200 may adjust the first time period for irradiating the first laser light. The LiDAR apparatus 200 may adjust the first time period based on a light quantity accumulation value obtained by accumulating a light quantity of received, reflected laser light. The LiDAR apparatus 200 may adjust the first time period by setting the number of pulses constituting the first laser light.

In operation 320, the LiDAR apparatus 200 may receive first reflected laser light of the first laser light reflected from a first object around the LiDAR apparatus 200, by using the optical sensor 230.

According to an embodiment, the LiDAR apparatus 200 may receive first reflected laser light of laser light irradiated from a plane light source toward a short-distance area around the LiDAR apparatus 200, the first reflected laser light reflected from the first object located in the short-distance area, by using the optical sensor 230. Alternatively, the LiDAR apparatus 200 may receive first reflected laser light of laser light irradiated from a line light source toward a long-distance area around the LiDAR apparatus 200, the first reflected laser light reflected from the first object located in the long-distance area, by using the optical sensor 230.

In operation 330, the LiDAR apparatus 200 may irradiate second laser light of a second type toward surroundings of the LiDAR apparatus 200 for a second time period following the first time period.

The second time period may be a time period following the first time period in the unit frame time period. That is, the LiDAR apparatus 200 may irradiate the second laser light of the second type after finishing irradiating the first laser light of the first type.

According to an embodiment, the second laser light of the second type may be laser light that is irradiated from a line light source of the LiDAR apparatus 200 toward a long-distance area around the LiDAR apparatus 200. The second type may indicate a 2D laser light type. Alternatively, the second laser light of the second type may be laser light that is irradiated from a plane light source of the LiDAR apparatus 200 toward a short-distance area around the LiDAR apparatus 200. The second type may indicate a 3D laser light type.

The LiDAR apparatus 200 may adjust the second time period for irradiating the second laser light. The LiDAR apparatus 200 may adjust the second time period based on a light quantity accumulation value obtained by accumulating a light quantity of received, reflected laser light. The LiDAR apparatus 200 may adjust the second time period by setting the number of pulses constituting the second laser light.

In operation 340, the LiDAR apparatus 200 may receive second reflected laser light of the second laser light reflected from a second object around the LiDAR apparatus 200, by using the optical sensor 230.

According to an embodiment, the LiDAR apparatus 200 may receive second reflected laser light of laser light irradiated from a line light source toward a long-distance area around the LiDAR apparatus 200, the second reflected laser light reflected from the second object located in the long-distance area, by using the optical sensor 230. Alternatively, the LiDAR apparatus 200 may receive second reflected laser light of laser light irradiated from a plane light source toward a short-distance area around the LiDAR apparatus 200, the second reflected laser light reflected from the second object located in the short-distance area, by using the optical sensor 230.

According to an embodiment, the LiDAR apparatus 200 may adjust the first time period or the second time period based on a light quantity accumulation value obtained by accumulating a light quantity of received, reflected laser light. The operation of adjusting an irradiation time of laser light based on a light quantity accumulation value by the LiDAR apparatus 200 will be described in detail below with reference to FIG. 9.

In operation 350, the LiDAR apparatus 200 may acquire an image frame including distance information representing a distance to the first object and distance information representing a distance to the second object, based on the first reflected laser light and the second reflected laser light.

An order in which operations 310 to 350 are performed is not limited to that shown in FIG. 3. Some of operations 310 to 350 may be performed simultaneously. For example, in operations 320 and 330, a part of the operation of receiving the first reflected laser light by the LiDAR apparatus 200 may be performed for the second time period. That is, after the LiDAR apparatus 200 starts the operation of irradiating the second laser light of the second type, the LiDAR apparatus 200 may receive a part of the first reflected laser light reflected from the first object.

According to an embodiment, the LiDAR apparatus 200 may analyze the first reflected laser light and the second reflected laser light according to a ToF method to thereby acquire an image frame. For example, the LiDAR apparatus 200 may calculate the distance to the first object based on a time at which the first laser light is irradiated and a time at which the first reflected laser light is received. The LiDAR apparatus 200 may calculate the distance to the second object based on a time at which the second laser light is irradiated and a time at which the second reflected laser light is received. The LiDAR apparatus 200 may acquire the image frame including the distance information representing the distance to the first object and the distance information representing the distance to the second object, based on the calculated distance to the first object and the calculated distance to the second object. The ToF method will be described in detail with reference to FIG. 4.

A method of acquiring an image frame including distance information by the LiDAR apparatus 200 is not limited to the above-described method and may be set variously. For example, the LiDAR apparatus 200 may analyze the first reflected laser light and the second reflected laser light according to a phase-shift method to acquire an image frame.

According to the LiDAR apparatus 200 and the control method thereof, as described above with reference to FIG. 3, when the LiDAR apparatus 200 acquires an image frame including distance information of an object located in a short-distance area around the LiDAR apparatus 200 and distance information of an object located in a long-distance area around the LiDAR apparatus 200 by using the plurality of light sources, the LiDAR apparatus 200 may acquire the distance information of the object located in the short-range area and the distance information of the object located in the long-distance area in a unit frame time period, thereby efficiently managing a frame rate.

Figure 4:
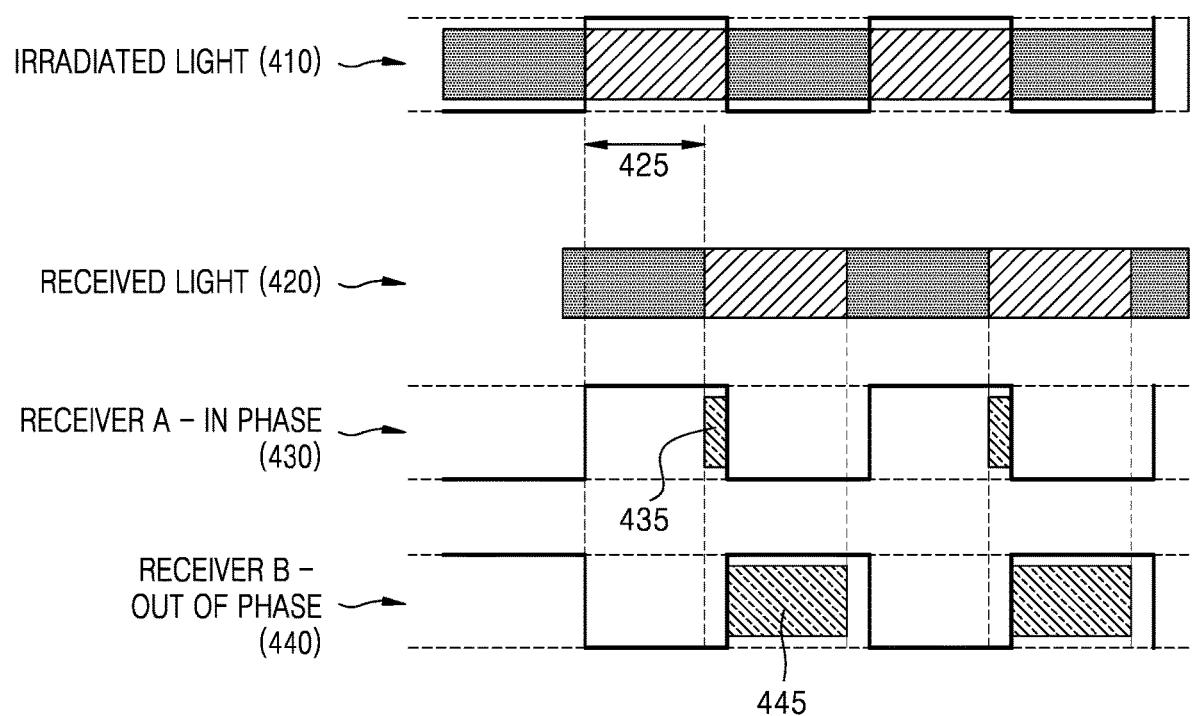
FIG. 4 is a diagram of a time-of-flight (TOF) method used by a LiDAR apparatus according to an embodiment to acquire distance information of an object.

FIG. 4 is a diagram of the ToF method used by the LiDAR apparatus 200 according to an embodiment to acquire distance information of an object.

The ToF method is a method of calculating a flight time of light, that is, a time taken for light to be irradiated, be reflected from an object, and then return to the LiDAR apparatus 200.

Referring to FIG. 4, there may be a time difference 425 between irradiated light 410 irradiated toward surroundings by the LiDAR apparatus 200 and a received light 420 of the irradiated light 410, the received light 420 reflected from an object and then received by the LiDAR apparatus 200.

The optical sensor 230 of the LiDAR apparatus 200 may include a receiver 430, i.e., a receiver A, for receiving in-phase received light, and a receiver 440, i.e., a receiver B, for receiving out-of-phase received light. For example, the receiver 430 and the receiver 440 may be included in the optical sensor 230. The receiver 430 may be activated in phase to sense light having the same phase as that of the irradiated light 420, and the receiver 440 may be activated out of phase to sense light having an opposite phase to that of the irradiated light 410. Activation and inactivation of the receiver 430 and the receiver 440 may be controlled by the processor of the LiDAR apparatus 200.

Due to the time difference 425 between the irradiated light 410 and the received light 420, a difference between a first light quantity 435 received and accumulated by the receiver 430 and a second light quantity 445 received and accumulated by the receiver 440 may be created. For example, when a distance between the LiDAR apparatus 200 and an object is 0 and accordingly, a time difference 425 is 0, the irradiated light 410 and the received light 420 may be in phase, and thus, the receiver may receive and accumulate the received light 420. However, when a distance between the LiDAR apparatus 200 and an object is d, the time difference 425 may be created while light moves to a distance of 2d, and thus, a first light quantity 435 may be different from a second light quantity 445. Accordingly, by using a ratio of the second light quantity 445 accumulated in the receiver 440 with respect to the first light quantity 435 accumulated in the receiver 430, a distance between the LiDAR apparatus 200 and the object may be calculated. The LiDAR apparatus 200 may calculate a distance to an object based on an irradiation time of laser light and a reception time of reflected laser light, by using the ToF method as described above.

Figure 5:
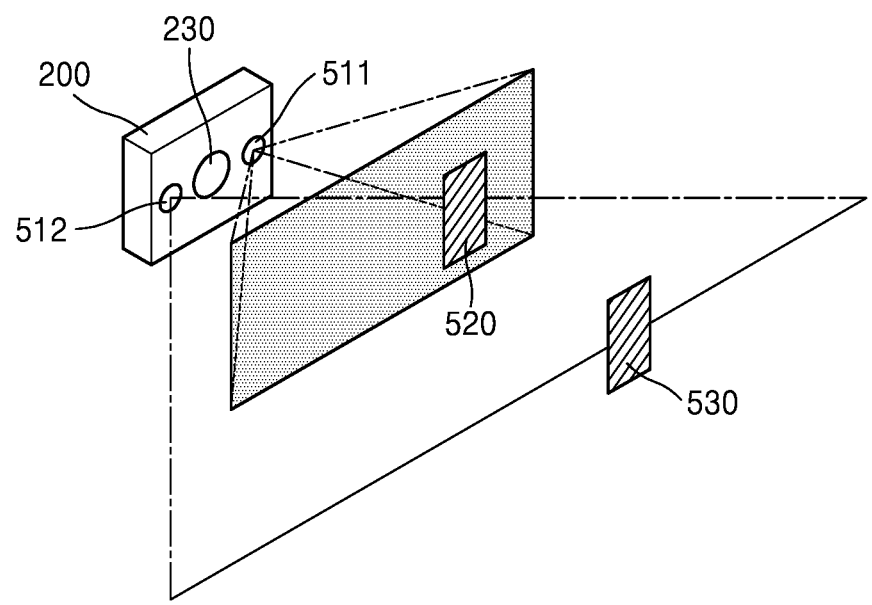
FIG. 5 is a view of a method, performed by a LiDAR apparatus according to an embodiment, of controlling a first light source and a second light source to irradiate laser light toward surroundings of the LiDAR apparatus.

FIG. 5 is a view of a method, performed by the LiDAR apparatus 200 according to an embodiment, of controlling the first light source and the second light source to irradiate laser light toward surroundings of the LiDAR apparatus 200.

Referring to FIG. 5, the LiDAR apparatus 200 may include an optical sensor 230, a plane light source 511, and a line light source 512. The plane light source 511 or the line light source 512 may be indicated as a first light source or a second light source, according to an irradiation order in a unit frame time period. For example, when the plane light source 511 first irradiates light in a unit frame time period, the plane light source 511 may be referred to as a first light source, and, when the line light source 512 first irradiates light in a unit frame time period, the line light source 512 may be referred to as a first light source.

The plane light source 511 may irradiate laser light toward a short-distance area around the LiDAR apparatus 200. The plane light source 511 may irradiate laser light of a 3D laser light type. The 3D laser light type may be a laser light type that is irradiated for 3D distance measurement for an FOV. For example, the laser light of the 3D laser light type may be irradiated as a 2D array toward an FOV.

The line light source 512 may irradiate laser light toward a long-distance area around the LiDAR apparatus 200. The line light source 512 may irradiate laser light of a 2D laser light type. The 2D laser light type may be a laser light type that is irradiated for 2D distance measurement for an FOV. For example, the laser light of the 2D laser light type may be irradiated as a 1D line toward an FOV.

The plane light source 511 may irradiate the laser light of the 3D laser light type to perform a 3D distance measurement on an FOV, thereby obtaining a more accurate measurement result than that obtained by a distance measurement using the line light source 512. However, to perform a 3D distance measurement on a long-distance area by using the plane light source 511, a high-powered light source might be required. Therefore, issues, such as high consumption power of the LiDAR apparatus 200, a laser safety concern due to irradiation of high-powered laser light, generation of diffused reflection, etc., might be introduced.

According to an embodiment, the LiDAR apparatus 200 may perform a 3D distance measurement on a short-distance area around the LiDAR apparatus 200 by using the plane light source 511, and perform a 2D distance measurement on a long-distance area around the LiDAR apparatus 200 by using the line light source 512 having a smaller output than the plane light source 511, thereby reducing consumption power and a laser light output of the LiDAR apparatus 200.

The LiDAR apparatus 200 may measure a distance to a first object 520 located in a short-distance area around the LiDAR apparatus 200 by using the plane light source 511. That is, the LiDAR apparatus 200 may measure a distance to the first object 520 by using first reflected laser light of laser light irradiated by controlling the plane light source 511 and reflected from the first object 520. The LiDAR apparatus 200 may measure a distance to a second object 530 located in a long-distance area around the LiDAR apparatus 200 by using the line light source 512. That is, the LiDAR apparatus 200 may measure a distance to the second object 530 by using second reflected laser light of laser light irradiated by controlling the line light source 512 and reflected from the second object 530.

An irradiation direction and output power of the laser light may be determined in advance, however, an irradiation distance of the laser light may be not determined. Accordingly, laser light irradiated by using the plane light source 511 may also be reflected from the second object 530 located in the long-distance area and received by the optical sensor 230, and laser light irradiated by using the line light source 512 may also be reflected from the first object 520 located in the short-distance area and received by the optical sensor 230. That is, the LiDAR apparatus 200 may measure a distance to the second object 530 located in the long-distance area by using the plane light source 511 or the line light source 512. However, a light reception capacity of the optical sensor 230 might be limited. Accordingly, when the LiDAR apparatus 200 measures a distance by using the plane light source 511, the optical sensor 230 may be saturated while the LiDAR apparatus 200 measures a short-distance area. In this case, the LiDAR apparatus 200 may fail to measure a long-distance area.

Figure 6:
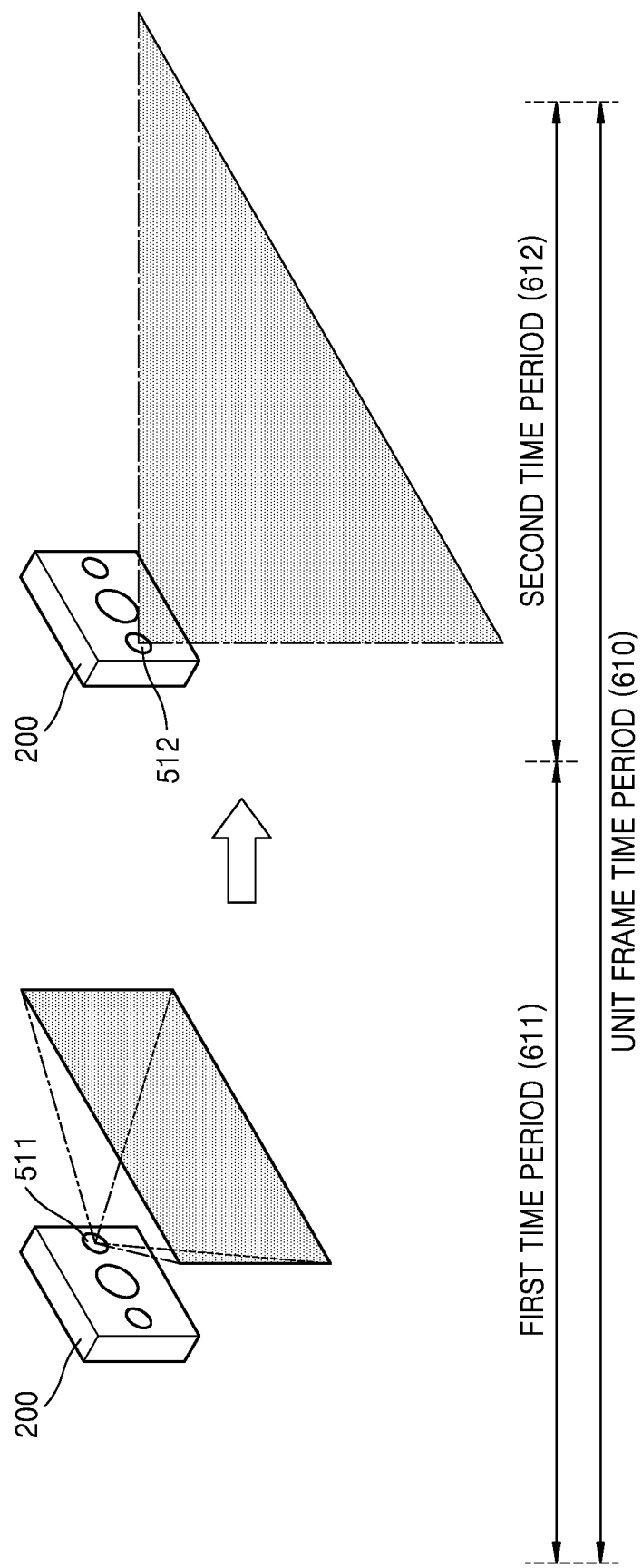
FIG. 6 is a view of a method, performed by a LiDAR apparatus according to an embodiment, of controlling a plane light source to irradiate laser light and then control a line light source to irradiate laser light.

FIG. 6 is a view of a method, performed by the LiDAR apparatus 200 according to an embodiment, of controlling a plane light source to irradiate laser light and then controlling a line light source to irradiate laser light.

Referring to FIG. 6, the LiDAR apparatus 200 may control the plane light source 511 for a first time period 611 in a unit frame time period 610 to irradiate first laser light of a 3D laser light type toward a short-distance area around the LiDAR apparatus 200, and may control the line light source 512 for a second time period 612 following the first time period 611 to irradiate second laser light of a 2D laser light type toward a long-distance area around the LiDAR apparatus 200.

According to an embodiment, the LiDAR apparatus 200 may perform a distance measurement on an object located in a long-distance area from the LiDAR apparatus 200 and an object located in a short-distance area from the LiDAR apparatus 200, by using first reflected laser light of the first laser light irradiated by the plane light source 511 for the first time period 611 and reflected from the object. The LiDAR apparatus 200 may determine the first time period 611 to finish irradiating the first laser light when the LiDAR apparatus 200 completes the distance measurement on the object located in the long-distance area and the distance measurement on the object located in the short-distance area by using the first reflected laser light, and might not irradiate the second laser light after the first time period 611.

Figure 7:
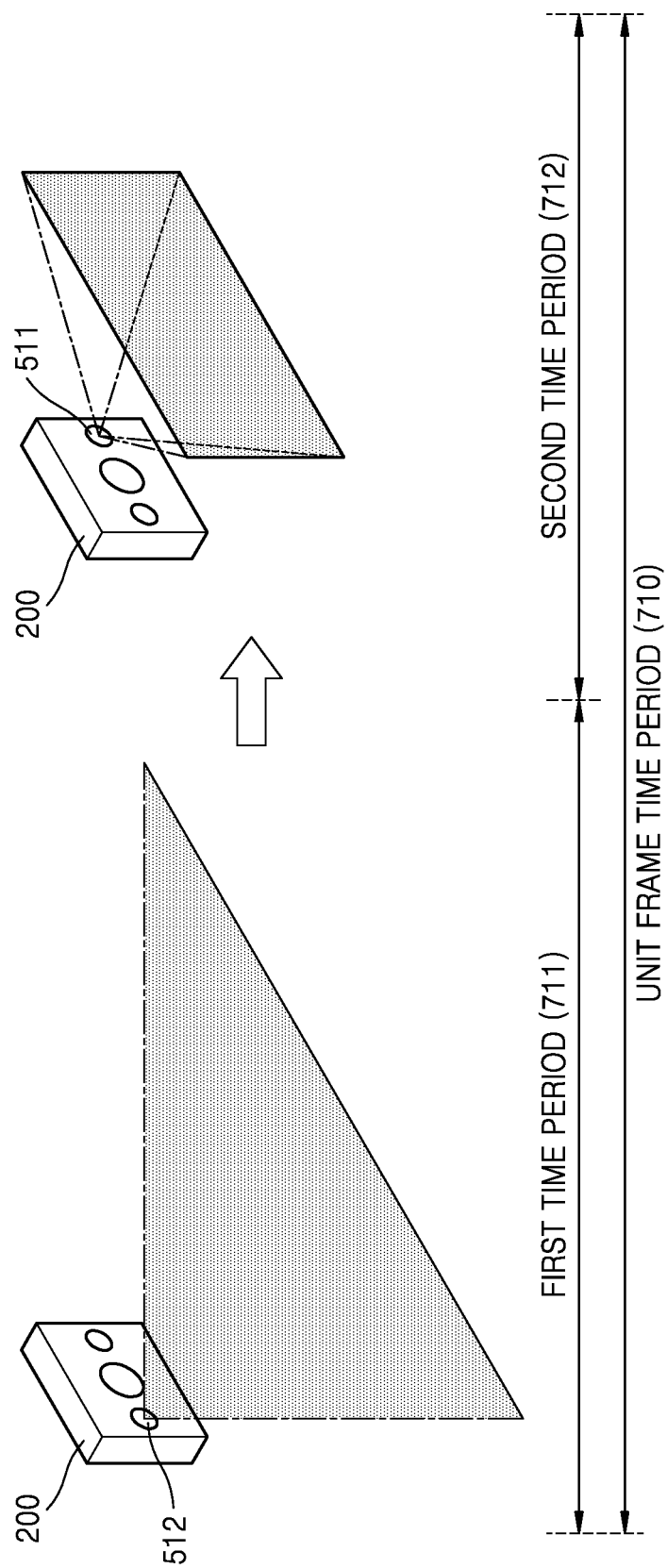
FIG. 7 is a view of a method, performed by a LiDAR apparatus according to an embodiment, of controlling a line light source to irradiate laser light and then controlling a plane light source to irradiate laser light.

FIG. 7 is a view of a method, performed by the LiDAR apparatus 200 according to an embodiment, of controlling the line light source 512 to irradiate laser light and then controlling the plane light source 511 to irradiate laser light.

Referring to FIG. 7, the LiDAR apparatus 200 may control the line light source 512 for a first time period 711 in a unit frame time period 710 to irradiate first laser light of a 2D laser light type toward a long-distance area around the LiDAR apparatus 200, and control the plane light source 511 for a second time period 712 following the first time period 711 to irradiate second laser light of a 3D laser light type toward a short-distance area around the LiDAR apparatus 200.

According to an embodiment, the LiDAR apparatus 200 may perform a distance measurement on an object located in a short-distance area from the LiDAR apparatus 200 and distance measurement on an object located in a long-distance area from the LiDAR apparatus 200, by using first reflected laser light of the first laser light irradiated by the line light source 512 for the first time period 711 and reflected from the object. The LiDAR apparatus 200 may determine the first time period 711 to finish irradiating the first laser light when the LiDAR apparatus 200 completes the distance measurement on the object located in the short-distance area and the distance measurement on the object located in the long-distance area by using the first reflected laser light, and might not irradiate the second laser light after the first time period 711.

Figure 8:
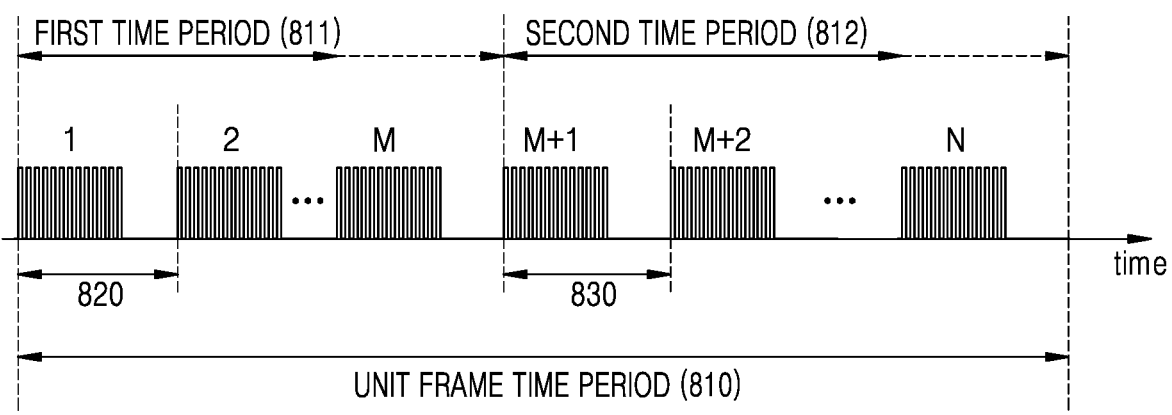
FIG. 8 is a diagram of a method, performed by a LiDAR apparatus according to an embodiment, of adjusting an irradiation time of laser light.

FIG. 8 is a diagram of a method, performed by the LiDAR apparatus 200 according to an embodiment, of adjusting an irradiation time of laser light.

Referring to FIG. 8, the LiDAR apparatus 200 may change the number of laser light pulse groups to be irradiated, thereby adjusting a length (that is, an irradiation time of first laser light) of a first time period 811 and a length (that is, an irradiation time of second laser light) of a second time period 812 in a unit frame time period 810.

The first laser light may include a plurality of first pulse groups, and the first pulse groups may be arranged at preset intervals. Each first pulse group may include a plurality of pulses. Likewise, the second laser light may include a plurality of second pulse groups, and the second pulse groups may be arranged at preset intervals. Each first pulse group may include a plurality of pulses.

When a time taken to irradiate a first pulse group is a first unit time 820 and the LiDAR apparatus 200 determines to irradiate M first light pulse groups in the unit frame time period 810, the first time period 811 may be determined to be M times of the first unit time 820. When the LiDAR apparatus 200 determines to irradiate M* first light pulse groups in the unit frame time period 810, the first time period 811 may change to M* times of the first unit time 820.

When a time taken to irradiate a second pulse group is a second unit time 830 and the LiDAR apparatus 200 determines to irradiate (N–M) second light pulse groups in the unit frame time period 810, the second time period 812 may be determined to be (N–M) times of the second unit time 830. When the LiDAR apparatus 200 determines to irradiate (N*–M) second light pulse groups in the unit frame time period 810, the second time period 812 may change to (N*–M) times of the second unit time 830.

According to an embodiment, the first laser light and the second laser light may include a plurality of pulses that are not classified into a pulse group. The LiDAR apparatus 200 may adjust the number of pulses included in each of the first laser light and the second laser light, thereby adjusting a length of the first time period 811 and a length of the second time period 812.

The first time period 811 and the second time period 812 may be time periods included in the unit frame time period 810. Accordingly, a sum of the first time period 811 and the second time period 812 may be identical to the unit frame time period 810 or might not be identical to the unit frame time period 810. For example, when the LiDAR apparatus 200 determines to early finish irradiating the first laser light and/or the second laser light, a sum of the first time period 811 and the second time period 812 may be less than the unit frame time period 810.

Figure 9:
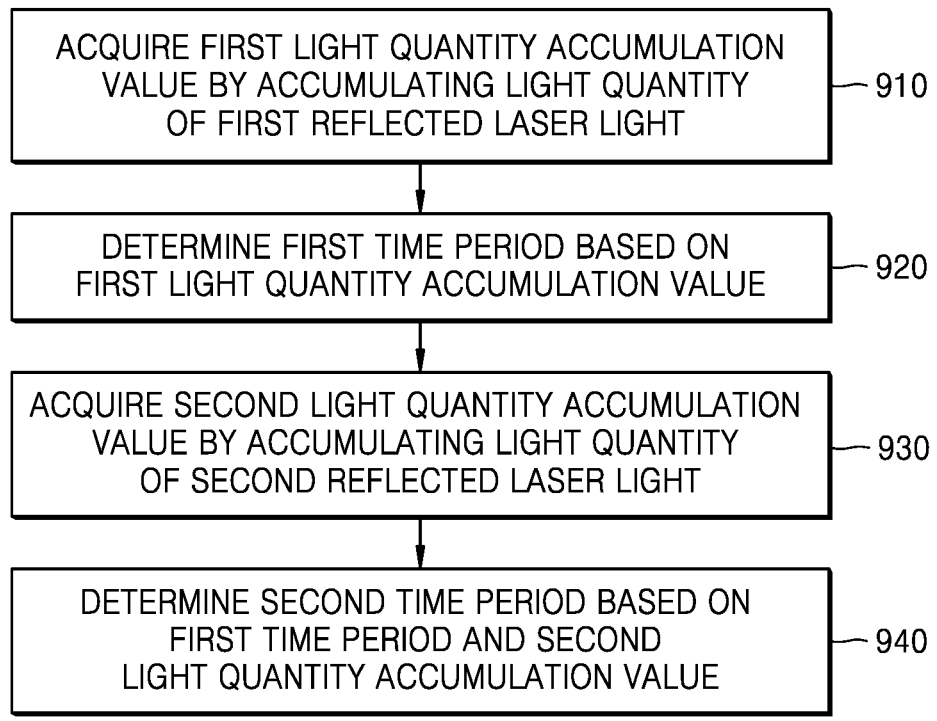
FIG. 9 is a flowchart of a method, performed by a LiDAR apparatus according to an embodiment, of adjusting an irradiation time of laser light based on a light quantity accumulation value of reflected laser light.

FIG. 9 is a flowchart of a method, performed by the LiDAR apparatus 200 according to an embodiment, of adjusting an irradiation time of laser light based on a light quantity accumulation value of reflected laser light.

Referring to FIG. 9, in operation 910, the LiDAR apparatus 200 may acquire a first light quantity accumulation value by accumulating a light quantity of first reflected laser light.

In described-above operation 310 of FIG. 3, the LiDAR apparatus 200 may irradiate first laser light of a first type toward the surroundings for a first time period. In described-above operation 320 of FIG. 3, the LiDAR apparatus 200 may receive first reflected laser light of the first laser light reflected from a first object located around the LiDAR apparatus 200, by using the optical sensor 230. The first time period may be set in advance before irradiating the first laser light.

The LiDAR apparatus 200 may acquire the first light quantity accumulation value by accumulating a light quantity of the first reflected laser light received by using the optical sensor 230. As described above with reference to FIG. 4, the first light quantity accumulation value may include an accumulation value of in-phase received light received through the receiver 430, and an accumulation value of out-of-phase received light received through the receiver 440. Hereinafter, the accumulation value of the in-phase received light is referred to as an in-phase accumulation value, and the accumulation value of the out-of-phase received light is referred to as an out-of-phase accumulation value.

In operation 920, the LiDAR apparatus 200 may determine a first time period based on the first light quantity accumulation value.

The optical sensor 230 of the LiDAR apparatus 200 might have a limited light reception capacity. That is, the optical sensor 230 may accumulate a light quantity of received laser light up to a saturation value of the optical sensor 230. Laser light received after the optical sensor 230 is saturated might no longer be accumulated in a light quantity accumulation value. That is, a maximum value of a light quantity accumulation value of the optical sensor 230 may be the saturation value of the optical sensor 230.

According to an embodiment, the LiDAR apparatus 200 may determine the first time period to irradiate the first laser light until the optical sensor 230 is saturated. For example, the LiDAR apparatus 200 may determine the first time period to finish irradiating the first laser light when the in-phase accumulation value or the out-of-phase accumulation value of the first light quantity accumulation value reaches the saturation value of the optical sensor 230.

The LiDAR apparatus 200 may determine the first time period to irradiate the first laser light up to a time at which the optical sensor 230 is expected to be saturated, based on the first light quantity accumulation value. For example, the LiDAR apparatus 200 may determine a saturation expected time at which the in-phase accumulation value and/or the out-of-phase accumulation value of the first light quantity accumulation value reaches the saturation value of the optical sensor 230, based on a change of the first light quantity accumulation value according to time. The LiDAR apparatus 200 may determine the saturation expected time by applying various methods, such as linear analysis or non-linear analysis, to the change of the first light quantity accumulation value according to time. The LiDAR apparatus 200 may determine the first time period to finish irradiating the first laser light at the determined saturation expected time.

The LiDAR apparatus 200 may measure a time difference between a time at which the first laser light is irradiated and a time at which the first reflected laser light is received, and determine the first time period to finish irradiating the first laser light at a time resulting from subtracting the time difference from the saturation expected time. For example, it is assumed that a time at which a K-th pulse group included in the first laser light is irradiated is t1, a time at which the K-th pulse group is reflected from the first object and received by the optical sensor 230 is t2, and a saturation expected time is determined as t3. In this case, the LiDAR apparatus 200 may determine the first time period to finish irradiating the first laser light at a time t3−(t2−t1). In other words, when an L-th pulse group included in the first laser light is irradiated, then reflected and received by the optical sensor 230 so that the optical sensor 230 is expected to be saturated, the LiDAR apparatus 200 may irradiate the first laser light up to the L-th pulse group.

Also, when the determined saturation expected time exceeds a preset time in a unit frame time period, the LiDAR apparatus 100 may determine the first time period to irradiate the first laser light up to the preset time. The preset time may be determined as various times, such as a time corresponding to 50%, 70%, or 100% of the unit frame time period.

According to an embodiment, when the first light quantity accumulation value is not enough to calculate a distance to the first object, that is, when a received amount of the first reflected laser light is not sufficient, the LiDAR apparatus 200 may extend a currently set first time period in the unit frame time period. For example, the LiDAR apparatus 200 may extend the first time period, when a greater one of an in-phase accumulation value or an out-of-phase accumulation value of a first light quantity accumulation value does not reach a preset portion (for example, 50%) of the saturation value of the optical sensor 230, at a preset time (for example, a time corresponding to 50% of the unit frame time period) in the unit frame time period. Also, when the saturation expected time does not reach the preset time (for example, a time corresponding to 50% of the unit frame time period) in the unit frame time period, the LiDAR apparatus 200 may extend the first time period as appropriate.

In operation 930, the LiDAR apparatus 200 may acquire a second light quantity accumulation value by accumulating a light quantity of the second reflected laser light.

In described-above operation 330 of FIG. 3, the LiDAR apparatus 200 may irradiate second laser light of a second type toward the surroundings for a second time period. As described above in operation 340 of FIG. 3, the LiDAR apparatus 200 may receive second reflected laser light of the second laser light reflected from a second object located around the LiDAR apparatus 200 by using the optical sensor 230. The second time period may be set in advance before irradiating the second laser light. The LiDAR apparatus 200 may set the second time period for irradiating the second laser light to start immediately after finishing irradiating the first laser light. For example, the LiDAR apparatus 200 may determine the second time period to start the second time period after the first time period determined in operation 920.

The LiDAR apparatus 200 may acquire a second light quantity accumulation value by accumulating a light quantity of the second reflected laser light received through the optical sensor 230. As described above with reference to FIG. 4, the second light quantity accumulation value may include an accumulation value of in-phase received light received through the receiver 430, and an accumulation value of out-of-phase received light received through the receiver 440. Hereinafter, the accumulation value of the in-phase received light is referred to as an in-phase accumulation value, and the accumulated value of the out-of-phase received light is referred to as an out-of-phase accumulation value.

In operation 940, the LiDAR apparatus 200 may determine the second time period based on the first time period and the second light quantity accumulation value.

The LiDAR apparatus 200 may initialize the optical sensor 230 to receive the second laser light after the first time period. That is, the LiDAR apparatus 200 may set a light quantity accumulation value of the optical sensor 230 to 0 after the first time period.

According to an embodiment, the LiDAR apparatus 200 may determine the second time period to irradiate the second laser light until the optical sensor 230 is saturated after the first time period determined in operation 920. For example, the LiDAR apparatus 200 may determine the second time period to finish irradiating the second laser light when the in-phase accumulation value or the out-of-phase accumulation value of the second light quantity accumulation value reaches the saturation value of the optical sensor 230.

The LiDAR apparatus 200 may determine the second time period to irradiate the second laser light up to a time at which the optical sensor 230 is expected to be saturated, based on the second light quantity accumulation value. For example, the LiDAR apparatus 200 may determine a saturation expected time at which the in-phase accumulation value or the out-of-phase accumulation value of the second light quantity accumulation value reaches the saturation value of the optical sensor 230, based on a change of the second light quantity accumulation value according to time. The LiDAR apparatus 200 may determine the saturation expected time by applying various methods, such as linear analysis or non-linear analysis, to a change of the second light quantity accumulation value according to time. The LiDAR apparatus 200 may determine the second time period to finish irradiating the second laser light at the determined saturation expected time.

The LiDAR apparatus 200 may measure a time difference between a time at which the second laser light is irradiated and a time at which the second reflected laser light is received, and determine the second time period to finish irradiating the second laser light at a time resulting from subtracting the time difference from the saturation expected time. For example, it is assumed that a time at which a K-th pulse group included in the second laser light is irradiated is t1, a time at which the K-th pulse group is reflected from the second object and received by the optical sensor 230 is t2, and a saturation expected time is determined as t3. In this case, the LiDAR apparatus 200 may determine the second time period to finish irradiating the second laser light at a time t3−(t2−t1). In other words, when an L-th pulse group included in the second laser light is irradiated, then reflected and received by the optical sensor 230 so that the optical sensor 230 is expected to be saturated, the LiDAR apparatus 200 may irradiate the second laser light up to the L-th pulse group.

When the determined saturation expected time exceeds a unit frame time period, the LiDAR apparatus 200 may determine the second time period to irradiate the second laser light up to the unit frame time period.

According to an embodiment, when the second light quantity accumulation value is not enough to calculate a distance to the second object, that is, when a received amount of the second reflected laser light is not sufficient, the LiDAR apparatus 200 may extend a currently set second time period in the unit frame time period. For example, the LiDAR apparatus 200 may extend the second time period, when a greater one of an in-phase accumulation value or an out-of-phase accumulation value of a second light quantity accumulation value does not reach a preset portion (for example, 50%) of the saturation value of the optical sensor 230, at a preset time (for example, a time corresponding to 80% of the unit frame time period) in the unit frame time period. Also, when the saturation expected time does not reach the preset time (for example, a time corresponding to 90% of the unit frame time period) in the unit frame time period, the LiDAR apparatus 200 may extend the second time period.

As described above with reference to FIG. 9, while the LiDAR apparatus 200 according to an embodiment irradiates laser light toward the surroundings, the LiDAR apparatus 200 may change the first time period or the second time period based on a light quantity accumulation value of received laser light, thereby efficiently measuring distances to surrounding objects.

Figure 10:
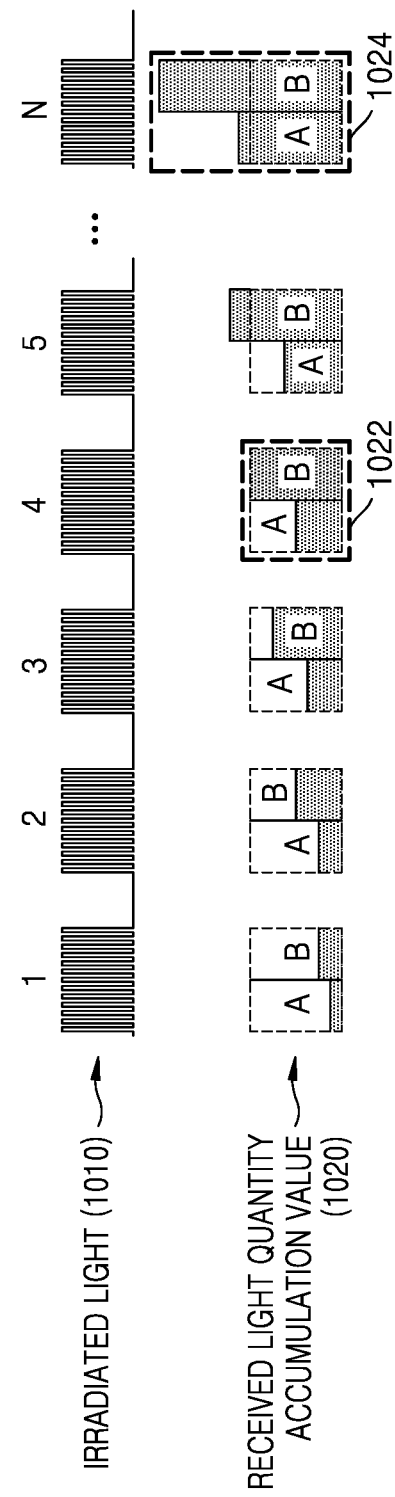
FIG. 10 is a diagram showing saturation of a light quantity accumulation value according to an embodiment.

FIG. 10 is a diagram showing saturation of a light quantity accumulation value according to an embodiment.

Referring to FIG. 10, irradiated portions of light 1010 irradiated by controlling the first light source and the second light source by the LiDAR apparatus 200, respectively, and received light quantity accumulation values 1020 respectively corresponding to pulse groups included in the irradiated portions of light 1010 are shown. That is, the received light quantity accumulation values 1020 may be obtained by accumulating light quantities of reflected laser light of the pulse groups included in the irradiated portions of light 1010.

As described above with reference to FIG. 4 and operation 910 of FIG. 9, the received light quantity accumulation values 1020 may include an accumulation value of in-phase received light received through the receiver 430, e.g., the receiver A, and an accumulation value of out-of-phase received light received through the receiver 440, e.g., the receiver B.

A first time 1022 of FIG. 10 may be a time at which an out-of-phase accumulation value of the received light quantity accumulation values 1020 reaches a saturation value of the optical sensor 230. Laser light received after the optical sensor 230 is saturated may be no longer accumulated as a light quantity accumulation value. Accordingly, out-of-phase received light received through the receiver 440 of the optical sensor 230 after the first time 1022 may be no longer accumulated as an out-of-phase accumulation value. Because the in-phase accumulation value does not reach the saturation value of the optical sensor 230 at the first time 1022, in-phase received light received through the receiver 430 of the optical sensor 230 may continue to be accumulated as an in-phase accumulation value even after the first time 1022.

However, a distance between the LiDAR apparatus 200 and the object may be calculated by using a ratio of the in-phase accumulation value and the out-of-phase accumulation value. When a distance between the LiDAR apparatus 200 and the object is calculated by using a received light quantity accumulation value 1020 obtained after the first time 1022, an error might be generated. For example, when a received light quantity accumulation value obtained at a second time 1024 is used, it might be difficult to accurately calculate a distance between the LiDAR apparatus 200 and the object because a ratio of an in-phase accumulation value and an out-of-phase accumulation value is 1.

The LiDAR apparatus 200 according to an embodiment may adjust a first time period and/or a second time period based on a received light quantity accumulation value, and calculate a distance to an object by using a received light quantity accumulation value when the optical sensor 230 is saturated or before the optical sensor 230 is saturated, as described above with reference to FIG. 9, thereby entirely or substantially eliminating an error due to the saturation of the optical sensor 230.

Figure 11:
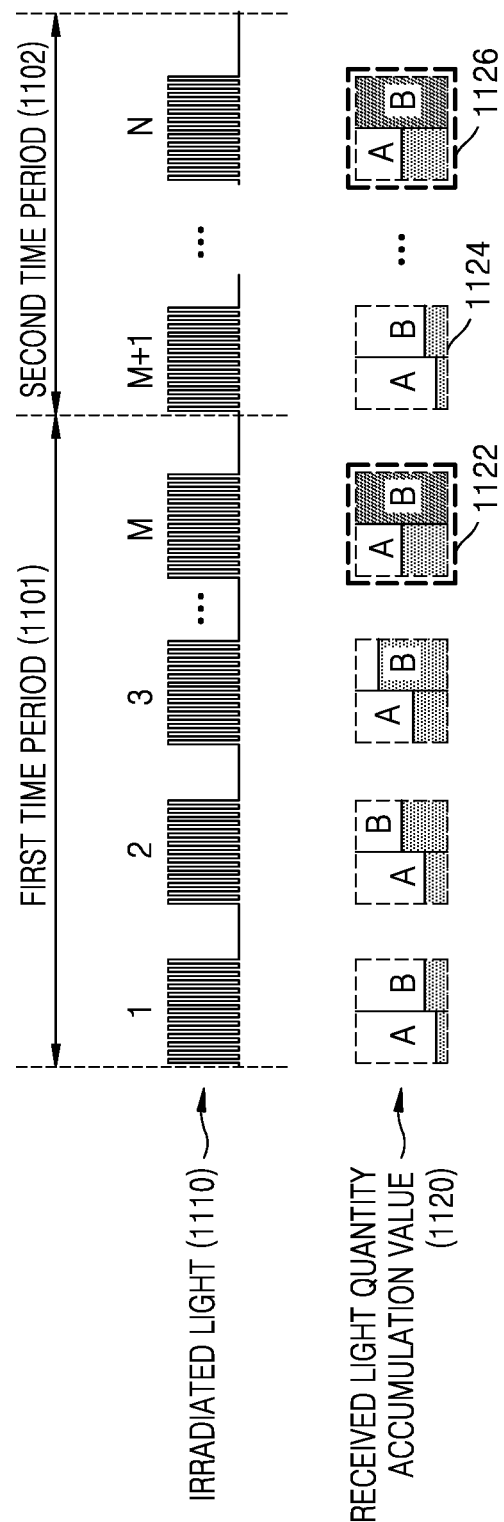
FIG. 11 is a diagram of a method, performed by a LiDAR apparatus according to an embodiment, of adjusting an irradiation time of laser light based on a saturation value of an optical sensor.

FIG. 11 is a diagram of a method, performed by the LiDAR apparatus 200 according to an embodiment, of adjusting an irradiation time of laser light based on a saturation value of the optical sensor 230.

Referring to FIG. 11, similarly to FIG. 10, irradiated portions of light 1110 irradiated by controlling the first light source or the second light source by the LiDAR apparatus 200, and received light quantity accumulation values 1120 respectively corresponding to pulse groups included in the irradiated portions of light 1110 are shown. That is, the received light quantity accumulation values 1120 may be obtained by accumulating light quantities of reflected laser lights of the pulse groups included in the irradiated portions of light 1110.

An out-of-phase accumulation value of a first light quantity accumulation value may reach a saturation value of the optical sensor 230 at a first time 1122. Accordingly, the LiDAR apparatus 200 may determine a first time period 1101 to finish irradiating first laser light when the first light quality accumulation value reaches the saturation value of the optical sensor 230. That is, the LiDAR apparatus 200 may determine the first time period 1101 to irradiate the first laser light up to the first time 1122.

The LiDAR apparatus 200 may predict saturation of the optical sensor 230 when an M-th pulse group is irradiated, then reflected, and received by the optical sensor 230, based on a change of the received light quantity accumulation value 1120 according to time. The LiDAR apparatus 200 may predict saturation of the optical sensor 230 when the M-th pulse group is irradiated, then reflected, and received by the optical sensor 230, based on a time difference between a time at which a K-th pulse group included in the first laser light is irradiated and a time at which the K-th pulse group is reflected from a first object and received by the optical sensor 230, and the received light quantity accumulation value 1120. For example, the LiDAR apparatus 200 may determine the first time period 1101 to irradiate the first laser light up to the M-th pulse group. As another example, the LiDAR apparatus 200 may determine the first time period 1101 to irradiate the first laser light up to a pulse group that has a lower order than the M-th pulse group, e.g., (M−2) pulse group.

As shown in FIG. 11, the LiDAR apparatus 200 may determine a second time period 1102 to irradiate second laser light after finishing irradiating the first laser light (that is, after the first time period 1101 terminates).

The LiDAR apparatus 200 may initialize the optical sensor 230 to receive the second laser light after the first time period 1101. That is, the LiDAR apparatus 200 may set the received light quantity accumulation value 1120 to 0 after the first time period 1101. Accordingly, a received light quality accumulation value 1120 at a second time 1124 may be an accumulation value of a light quantity when a first pulse group (M+1) of the irradiated portion of light 1110 included in the second laser light is reflected from a second object and received by the optical sensor 230.

An out-of-phase accumulation value of a second light quality accumulation value may reach the saturation value of the optical sensor 230 at a third time 1126. Accordingly, the LiDAR apparatus 200 may determine the second time period 1102 to finish irradiating the second laser light when the second light quantity accumulation value reaches the saturation value of the optical sensor 230. That is, the LiDAR apparatus 200 may determine the second time period 1102 to irradiate the second laser light up to the third time 1126.

For example, the LiDAR apparatus 200 may predict saturation of the optical sensor 230 when an N-th pulse group of the irradiated light 1110 is irradiated, then reflected, and received by the optical sensor 230, based on a change of the received light quality accumulation value 1120 according to time. The LiDAR apparatus 200 may predict saturation of the optical sensor 230 when the N-th pulse group is irradiated, then reflected, and received by the optical sensor 230, based on a time difference between a time at which a P-th pulse group included in the second laser light is irradiated and a time at which the P-th pulse group is reflected from the second object and received by the optical sensor 230, and the received light quantity accumulation value 1120. Accordingly, the LiDAR apparatus 200 may determine the second time period 1102 to irradiate the second laser light up to the N-th pulse group. As another example, the LiDAR apparatus 200 may determine the second time period 1102 to irradiate the second laser light up to a pulse group of a lower order than the N-th pulse group, e.g., (N−1) pulse group.

Figure 12:
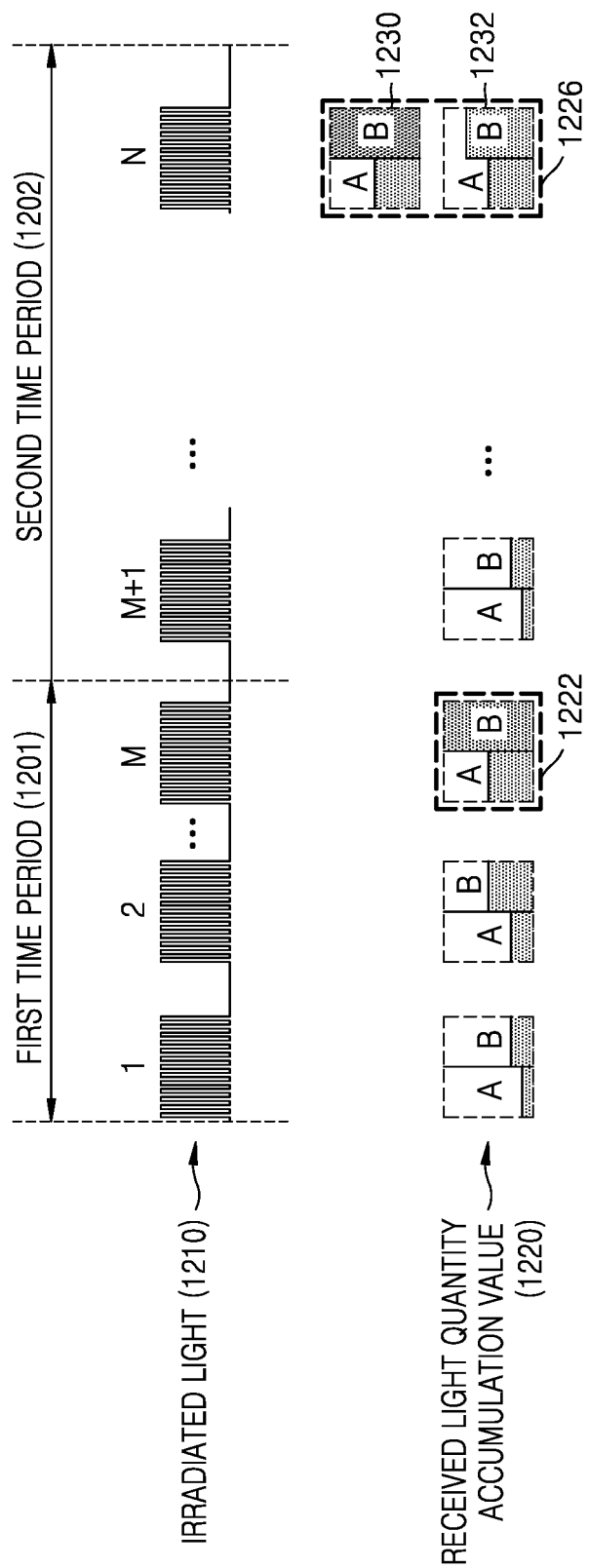
FIG. 12 is a diagram of a method, performed by a LiDAR apparatus according to an embodiment, of adjusting an irradiation time of laser light based on a unit frame time period.

FIG. 12 is a diagram of a method, performed by the LiDAR apparatus 200 according to an embodiment, of adjusting an irradiation time of laser light based on a frame time period.

Referring to FIG. 12, similarly to FIG. 10, irradiated portions of light 1210 irradiated by controlling the first light source or the second light source by the LiDAR apparatus 200, and received light quantity accumulation values 1220 respectively corresponding to pulse groups included in the irradiated portions of light 1210 are shown. That is, the received light quantity accumulation values 1220 may be obtained by accumulating light quantities of reflected laser lights of the pulse groups included in the irradiated portions of light 1210.

The LiDAR apparatus 200 may determine a first time period 1201 to irradiate first laser light up to a time at which the optical sensor 230 is expected to be saturated, based on the received light quantity accumulation values 1220. For example, the LiDAR apparatus 200 may determine a saturation expected time at which an in-phase accumulation value or an out-of-phase accumulation value of a first light quantity accumulation value is expected to reach a saturation value of the optical sensor 230, based on a change of the first light quantity accumulation value according to time. The LiDAR apparatus 200 may determine the first time period 1201 to finish irradiating the first laser light at the determined saturation expected time.

However, when a light intensity of first reflected laser light is relatively weak, the saturation expected time of the first light quantity accumulation value may be delayed. For example, when the saturation expected time is a time reaching 80% of a unit frame time period, a second time period 1202 for irradiating second laser light after the LiDAR apparatus 200 finishes irradiating the first laser light may be 20% or less of the unit frame time period. When the second time period 1202 is short, a received amount of second reflected laser light might be not enough to calculate a distance between the LiDAR apparatus 200 and a second object.

Accordingly, when the determined saturation expected time exceeds a preset time in a unit frame time period, the LiDAR apparatus 200 may determine the first time period 1201 to irradiate the first laser light up to the preset time. The preset time may be determined as various times, such as a time corresponding to 50%, 70%, or 100% of the unit frame time period. In FIG. 12, a case in which the first time period 1201 is determined to finish irradiating the first laser light at a first time 1222 before the first light quantity accumulation value is saturated is shown. For example, the LiDAR apparatus 200 may determine the first time period 1201 to irradiate the first laser light up to an M-th pulse group.

The LiDAR apparatus 200 may irradiate second laser light for a second time period 1202 after the first time period 1201. However, when a light intensity of second reflected laser light is relatively weak, a saturation expected time of a second light quantity accumulation value may exceed an end of a unit frame time period. Also, the optical sensor 230 might not be saturated at an end of a unit frame time period. The LiDAR apparatus 200 may determine the second time period 1202 to finish irradiating the second laser light although the optical sensor 230 is not saturated at an end of a unit frame time period, to prevent a frame rate from being reduced. That is, the LiDAR apparatus 200 may determine the second time period 1202 such that an end time of the second time period 1202 does not exceed an end of a unit frame time period. As shown in FIG. 12, the second light quantity accumulation value may be saturated (reference humeral 1230) or might not be saturated (reference humeral 1232) at a second time 1226 which is an end of the second time period 1202.

An embodiment may be implemented as a computer-readable recording medium storing software (e.g., a program) containing one or more instructions executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented by an arbitrary method or technology for storing information, such as a computer-readable instruction, a data structure, a program module, or other data. The communication medium may generally include other data of modulated data signals, such as computer-readable instructions, data structures, or program modules.

The above-described is for illustrative purposes, and it will be apparent that those of ordinary skill in the art may make various modifications thereto without changing the technical spirit and essential features of the disclosure. Thus, it should be understood that the embodiments described above are merely for illustrative purposes and not for limitation purposes in all aspects. For example, each component described as a single type may be implemented in a distributed type, and components described as distributed may be implemented in a combined form.

While embodiments are particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method of acquiring distance information of an object by using a Light Detection and Ranging (LiDAR) apparatus, the method comprising:
    irradiating a first laser light of a first type toward surroundings of the LiDAR apparatus for a first time period;
    receiving a first reflected laser light of the first laser light reflected from a first object located around the LiDAR apparatus, by using an optical sensor of the LiDAR apparatus;
    irradiating a second laser light of a second type, which is different from the first type, toward the surroundings of the LiDAR apparatus for a second time period following the first time period;
    receiving a second reflected laser light of the second laser light reflected from a second object located around the LiDAR apparatus, by using the optical sensor; and
    acquiring an image frame including first distance information representing a distance between the LiDAR apparatus and the first object and second distance information representing a distance between the LiDAR apparatus and the second object, based on the first reflected laser light and the second reflected laser light,
    wherein the first time period is determined based on a first light quantity accumulation value, which is acquired by accumulating a light quantity of the first reflected laser light, and
    wherein the second time period is determined based on the determined first time period and a second light quantity accumulation value, which is acquired by accumulating a light quantity of the second reflected laser light.

2. The method of claim 1, wherein the acquiring the image frame further comprises:
    calculating the distance between the LiDAR apparatus and the first object based on a time at which the first laser light is irradiated and a time at which the first reflected laser light is received; and
    calculating the distance between the LiDAR apparatus and the second object based on a time at which the second laser light is irradiated and a time at which the second reflected laser light is received.

3. The method of claim 1, wherein the first laser light of the first type is irradiated toward a short-distance area around the LiDAR apparatus from a plane light source of the LiDAR apparatus, and
    the second laser light of the second type is irradiated toward a long-distance area around the LiDAR apparatus from a line light source of the LiDAR apparatus.

4. The method of claim 1, wherein the first laser light of the first type is irradiated toward a long-distance area around the LiDAR apparatus from a line light source of the LiDAR apparatus, and
    the second laser light of the second type is irradiated toward a short-distance area around the LiDAR apparatus from a plane light source of the LiDAR apparatus.

5. The method of claim 1, further comprising:
    calculating the distance between the LiDAR apparatus and the first object based on a first ratio of a first in-phase accumulation value and a first out-of-phase accumulation corresponding to the first reflected laser light, and
    calculating the distance between the LiDAR apparatus and the second object based on a second ratio of a second in-phase accumulation value and a second out-of-phase accumulation corresponding to the second reflected laser light.

6. The method of claim 1, wherein the first time period is determined further based on a unit frame time period corresponding to the image frame and a saturation expected time at which a first in-phase accumulation value or a first out-of-phase accumulation value reaches the saturation value of the optical sensor of the LiDAR apparatus.

7. The method of claim 1, wherein the first laser light includes a plurality of first pulse groups,
    the second laser light includes a plurality of second pulse groups,
    a length of the first time period is adjusted by changing a number of the plurality of first pulse groups, and
    a length of the second time period is adjusted by changing a number of the plurality of second pulse groups.

8. The method of claim 7, wherein the plurality of first pulse groups are arranged at first preset intervals, each of the plurality of first pulse groups including a first plurality of pulses, and
    the plurality of second pulse groups are arranged at second preset intervals, each of the plurality of second pulse groups including a second plurality of pulses.

9. The method of claim 1, wherein the first time period is determined to finish irradiating the first laser light based on the first light quantity accumulation value reaching a saturation value of the optical sensor.

10. The method of claim 9, wherein
    the second time period is determined to irradiate the second laser light after the irradiating of the first laser light is finished, and
    to finish irradiating the second laser light based on the second light quantity accumulation value reaching the saturation value of the optical sensor.

11. The method of claim 9, wherein the first time period is determined further based on a unit frame time period corresponding to the image frame and a saturation expected time at which the first light quantity accumulation value reaches the saturation value of the optical sensor of the LiDAR apparatus, wherein the saturation expected time is determined based on a change of the first light quantity accumulation value according to time.

12. A Light Detection and Ranging (LiDAR) apparatus comprising:
    a first light source configured to irradiate a first laser light of a first type;
    a second light source configured to irradiate a second laser light of a second type different from the first type;
    an optical sensor; and
    at least one processor configured to:
        control the first light source to irradiate the first laser light toward surroundings of the LiDAR apparatus for a first time period,
        receive a first reflected laser light of the first laser light reflected from a first object located around the LiDAR apparatus by using the optical sensor,
        control the second light source to irradiate the second laser light toward the surroundings of the LiDAR apparatus for a second time period following the first time period,
        receive a second reflected laser light of the second laser light reflected from a second object located around the LiDAR apparatus by using the optical sensor, and
        acquire an image frame including first distance information representing a distance between the LiDAR apparatus and the first object and second distance information representing a distance between the LiDAR apparatus and the second object, based on the first reflected laser light and the second reflected laser light,
    wherein the first time period is determined based on a first light quantity accumulation value which is acquired by accumulating a light quantity of the first reflected laser light, and
    wherein the second time period is determined based on the determined first time period and a second light quantity accumulation value which is acquired by accumulating a light quantity of the second reflected laser light.

13. The LiDAR apparatus of claim 12, wherein the at least one processor is further configured to:
    calculate the distance between the LiDAR apparatus and the first object based on a time at which the first laser light is irradiated and a time at which the first reflected laser light is received; and
    calculate the distance between the LiDAR apparatus and the second object based on a time at which the second laser light is irradiated and a time at which the second reflected laser light is received.

14. The LiDAR apparatus of claim 12, wherein the first light source includes a plane light source,
    the first laser light of the first type is irradiated toward a short-distance area around the LiDAR apparatus from the plane light source,
    the second light source includes a line light source, and
    the second laser light of the second type is irradiated toward a long-distance area around the LiDAR apparatus from the line light source.

15. The LiDAR apparatus of claim 12, wherein the first light source includes a line light source,
    the first laser light of the first type is irradiated toward a long-distance area around the LiDAR apparatus from the line light source,
    the second light source includes a plane light source, and
    the second laser light of the second type is irradiated toward a short-distance area around the LiDAR apparatus from the plane light source.

16. The LiDAR apparatus of claim 12, wherein the first laser light includes a plurality of first pulse groups,
    the second laser light includes a plurality of second pulse groups, and
    the at least one processor is further configured to:
        adjust a length of the first time period by changing a number of the plurality of first pulse groups, and
        adjust a length of the second time period by changing a number of the plurality of second pulse groups.

17. The LiDAR apparatus of claim 16, wherein the plurality of first pulse groups are arranged at first preset intervals, each of the plurality of first pulse groups including a first plurality of pulses, and
    the plurality of second pulse groups are arranged at second preset intervals, each of the plurality of second pulse groups including a second plurality of pulses.

18. The LiDAR apparatus of claim 12, wherein the at least one processor is further configured to determine the first time period to finish irradiating the first laser light based on the first light quantity accumulation value reaching a saturation value of the optical sensor.

19. The LiDAR apparatus of claim 18, wherein the at least one processor is further configured to:
    determine the second time period to irradiate the second laser light after the irradiating of the first laser light is finished, and
    determine the second time period to finish irradiating the second laser light based on the second light quantity accumulation value reaching the saturation value of the optical sensor.

20. A non-transitory computer-readable recording medium storing a program which, when executed by a computer system, causes the computer system to perform a method for controlling a Light Detection and Ranging (LiDAR) apparatus, the method comprising:
    irradiating a first laser light of a first type toward surroundings of the LiDAR apparatus for a first time period;
    receiving a first reflected laser light of the first laser light reflected from a first object located around the LiDAR apparatus, by using an optical sensor of the LiDAR apparatus;
    irradiating a second laser light of a second type, which is different from the first type, toward the surroundings of the LiDAR apparatus for a second time period following the first time period;
    receiving a second reflected laser light of the second laser light reflected from a second object located around the LiDAR apparatus, by using the optical sensor; and
    acquiring an image frame including first distance information representing a distance between the LiDAR apparatus and the first object and second distance information representing a distance between the LiDAR apparatus and the second object, based on the first reflected laser light and the second reflected laser light,
    wherein the first time period is determined based on a first light quantity accumulation value which is acquired by accumulating a light quantity of the first reflected laser light, and
    wherein the second time period is determined based on the determined first time period and a second light quantity accumulation value which is acquired by accumulating a light quantity of the second reflected laser light.

* * * * *